United States Patent [19]
Diekwisch

[11] Patent Number: 5,692,584
[45] Date of Patent: Dec. 2, 1997

[54] MEMBRANE PRESS AND WORK BASE

[75] Inventor: Hartmut Diekwisch, Herford, Germany

[73] Assignee: Smartech LLC, Charlotte, N.C.

[21] Appl. No.: 644,049

[22] Filed: May 9, 1996

Related U.S. Application Data

[63] Continuation of Ser. No. 229,976, Apr. 19, 1994, Pat. No. 5,522,478.

[51] Int. Cl.⁶ .................................................. B66B 9/04
[52] U.S. Cl. .................................................. 187/273; 269/27
[58] Field of Search ................................. 187/273, 274; 269/21, 27, 58, 309; 100/224, 90, 918, 299

[56] References Cited

U.S. PATENT DOCUMENTS

| | | | |
|---|---|---|---|
| 4,314,814 | 2/1982 | Deroode | 156/583.3 |
| 4,447,282 | 5/1984 | Valerio et al. | 156/583.3 |
| 5,225,027 | 6/1993 | Diekwisch | 156/382 |
| 5,346,193 | 9/1994 | Kitagawa | 269/21 |
| 5,397,214 | 3/1995 | Cheung | 187/274 |

FOREIGN PATENT DOCUMENTS

| | | | |
|---|---|---|---|
| 2-139147 | 5/1990 | Japan | B23Q 3/02 |

OTHER PUBLICATIONS

Prof. Rolf Hesch, "Membrane Press Systems A Critical Comparison With View to Heating Systems, Heat Distribution, Pressing Time and Costs," all pages.

Heinrich Wemhöner, "The Development of Membrane Press Technology," all pages.

FDM's Woodworking Technology 2000, "Unbeatable Doors at Any Price," Oct. 1993, all pages.

Primary Examiner—Kenneth Noland
Attorney, Agent, or Firm—Adams Law Firm, P.A.

[57] ABSTRACT

The invention is an improved membrane press, and method of elevating a workpiece above the supporting surface of a work base. The membrane press includes a work base having a supporting surface for carrying the workpiece, and a foil-pressing frame positioned above the workpiece for heating and applying the laminating foil to the workpiece. The improvement in the membrane press includes a plurality of workpiece-lifting pedestals residing substantially beneath the supporting surface of the work base. A piston is located beneath each pedestal, and responds to the placement of the workpiece onto the supporting surface of the work base. The piston imparts an upward force on certain ones of the pedestals residing adjacent to and beneath the workpiece to raise the pedestals and workpiece upwardly above the supporting surface of the work base. The raised pedestals permit the top surface, corners, and peripheral borders of the elevated workpiece to be laminated.

1 Claim, 7 Drawing Sheets

MEMBRANE PRESS AND WORK BASE

This application is a continuation of application Ser. No. 08/229,976, filed on Apr. 19, 1994, now U.S. Pat. No. 5,522,478.

TECHNICAL FIELD AND BACKGROUND OF THE INVENTION

This invention relates to a membrane press, and a method of elevating a workpiece above the supporting surface of a work base, such as a press table. Membrane presses have been in existence since the early 1900's, and are used for applying a uniform, laminating exterior veneer to the top surface, corners, and peripheral borders of a relatively flat, three-dimensional workpiece. The resulting laminated workpieces are typically used in furniture fronts, doors, cabinetry, desks, and other similar items where pleasing outward appearance and durability is desirable.

The production of dome-type membrane presses for laminating a workpiece with a veneer began in the 1930's. These type presses were effective for laminating particularly bent or curved furniture parts. However, the later development of a durable, wood-based MFD board, and the trend toward furniture designs with flat surfaces and sharp edges rapidly diminished the industry demand for dome-type presses. In response to the new furniture trends, a new membrane press was developed incorporating the design of a flat press. Flat presses have larger dimensions and allow increased production. Today, dome-type membrane presses are seldom used for laminating, and are only necessary for very curved workpieces.

The pressing cycle of the present-day membrane press, using combined contact and convection heating, takes place in essentially four stages. The membrane press is first opened, and the laminating foil clamped along respective edges to a tensioning frame located directly above the workpiece to be laminated. The tensioning frame includes a top heating platen and membrane located adjacent to and above the laminating foil. The membrane is sucked upwardly by a vacuum source to the top heating platen which acts to heat the membrane.

In a second stage, the membrane press is closed over the workpiece, and the membrane ventilated through exhaust passages. Hot air is circulated between the top heating platen and membrane to further heat the membrane. The foil is sucked upwardly into contact with the heated membrane by a second vacuum source to plastify the foil.

Thirdly, a third vacuum source is established under the plastified foil to prevent air pockets from forming between the foil and exterior surface of the workpiece. The hot air circulated between the top heating platen and membrane is replaced by pressurized heated air to force the membrane and laminating foil downwardly onto the surface of the workpiece.

Finally, separation air is injected between the foil and membrane to lift and separate the membrane from the foil. After pressing, any excess foil overlapping the peripheral borders and corners of the laminated workpiece is removed by cutting. An addition surface finish or coating may then be applied to the workpiece to create a finished product ready for use in a furniture front, or similar article.

In order to properly and uniformly apply the laminating foil to the peripheral borders and corners of the workpiece, as described above, the workpiece must be slightly elevated above the supporting surface of the press table. According to prior art presses, a relatively thin particle board, often referred to as a dummy board, piggyback board, or raiser panel, is placed under the workpiece. These dummy boards limit the production of the press, since the corners of the boards often crumble during pressing. The crumbled particles then become positioned under the foil, which ultimately results in workpiece rejects because the particles show through the foil. Moreover, the dummy boards must be shaped and sized to fit the dimensions of each particular workpiece.

The present invention is an alternative means for elevating a workpiece above the supporting surface of a work press, such as a membrane press. The present invention utilizes the already-existing vacuum force acting beneath the workpiece and foil to elevate the workpiece. This results in increased production of the press, and reduces the number of workpiece rejects.

SUMMARY OF THE INVENTION

Therefore, it is an object of the invention to provide an improved membrane press which eliminates a need for dummy boards to elevate the workpiece above the supporting surface of the press table during pressing.

It is another object of the invention to provide a membrane press including means operable for elevating any given custom-sized, three-dimensional workpiece.

It is another object of the invention to provide a membrane press having increased production capability.

It is another object of the invention to provide a membrane press which produces a reduced number of workpiece rejects.

It is another object of the invention to provide a membrane press which includes a workpiece elevating means responsive to the placement of the workpiece onto the press table.

It is another object of the invention to provide a membrane press which utilizes a pre-existing vacuum source to elevate the workpiece during pressing.

It is another object of the invention to provide a workpiece elevating means for being incorporated into any work base not limited to membrane presses.

It is another object of the invention to provide a workpiece elevating means operable for elevating any given custom-sized, three-dimensional workpiece.

It is another object of the invention to provide a workpiece elevating means for being incorporated into a work base, such as that for use in CNC routers, thermal-forming presses, deep-draw machines (vacuum presses), or any machine combining surface and edge processing in a single step.

These and other objects of the present invention are achieved in the preferred embodiments disclosed below by providing an improved membrane press for applying a laminating foil to a three-dimensional workpiece to be laminated. The membrane press includes a work base having a supporting surface for carrying the workpiece. A foil-pressing frame is positioned above the workpiece for heating and applying the laminating foil to the workpiece. The improvement in the membrane press includes means for lifting the workpiece above the supporting surface of the work base.

The elevating means include a plurality of workpiece-lifting pedestals residing substantially beneath the supporting surface of the work base. Upward movement of the pedestals results from placement of the workpiece onto the supporting surface of the work base. An upward force is imparted on certain ones of the pedestals residing adjacent to and beneath the workpiece to raise the pedestals and workpiece upwardly above the supporting surface of the work base, thus permitting the top surface, corners, and peripheral borders of the elevated workpiece to be laminated.

According to one preferred embodiment of the invention, the elevating means includes a piston and cylinder located within the work base and associated with each one of the plurality of pedestals.

According to another preferred embodiment of the invention, a source of negative air flow pneumatically communicates with the piston to induce upward movement of the piston within the cylinder.

According to yet another preferred embodiment of the invention, the piston is located beneath the pedestal and cooperates with the source of negative air flow to urge the pedestal upwardly above the supporting surface of the work base.

According to yet another preferred embodiment of the invention, the piston and pedestal are connected together for pneumatically-induced, unison movement.

According to yet another preferred embodiment of the invention, the work base includes an intake passage formed therein pneumatically communicating with a rod side of the piston. The intake passage cooperates with the source of negative air flow to pneumatically induce upward movement of the piston within the cylinder.

According to yet another preferred embodiment of the invention, the pedestal defines a longitudinal bore therethrough pneumatically communicating with the cylinder and intake passage of the work base. The bore cooperates with the source of negative air flow to pull in air from above the supporting surface of the work base, and to move the air through the pedestal and intake passage. Thus, when the workpiece is loaded onto the supporting surface adjacent to and above the pedestal, air flow through the pedestal is sealed and a resulting suction force acts on the rod side of the piston to urge the piston upwardly within the cylinder to lift the pedestal and workpiece above the supporting surface of the work base.

According to yet another preferred embodiment of the invention, an exhaust passage is formed in the work base for pneumatically communicating with a blind side of the piston to exhaust air from the work base after the workpiece is removed from the supporting surface and the piston returns to its original position within the cylinder.

An embodiment of the method of elevating a three-dimensional workpiece above the supporting surface of a work base according to the invention includes the steps of first loading the workpiece to be elevated onto the supporting surface of the work base. After loading, the workpiece is pneumatically lifted above the supporting surface of the work base by means responsive to the placement of the workpiece onto the supporting surface of the work base.

A second embodiment of the method of elevating a three-dimensional workpiece above the supporting surface of a work base having a plurality of top-surface openings therein communicating with a plurality of cylinders for receiving and housing a plurality of workpiece-lifting pedestals positioned within the cylinders for movement between a workpiece-loading position and a workpiece-laminating position above the supporting surface of the work base includes the step of loading the workpiece to be elevated onto the supporting surface of the work base. A second step includes lifting those pedestals covered by the workpiece upwardly from the workpiece-loading position to the workpiece-laminating position in response to placement of the workpiece onto the supporting surface of the work base to thereby elevate the workpiece above the supporting surface of the work base.

According to another preferred embodiment of the invention, the method further includes the step of directing a flow of air from above the supporting surface of the work base, through the pedestal, and through an intake passage formed in the work base. Thus, blocking air flow through the pedestal creates negative air pressure acting on the pedestal to lift the pedestal upwardly above the supporting surface of the work base.

According to yet another preferred embodiment of the invention, the method further includes the step of locating a piston within each of the cylinders for cooperating with the air flow for pneumatically-induced upward movement of the piston and the pedestal within the cylinder.

According to yet another preferred embodiment of the invention, the step of locating a piston within each of the cylinders further includes the step of connecting the piston to a bottom end of the pedestal for pneumatically-induced, unison movement of the piston and the pedestal.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
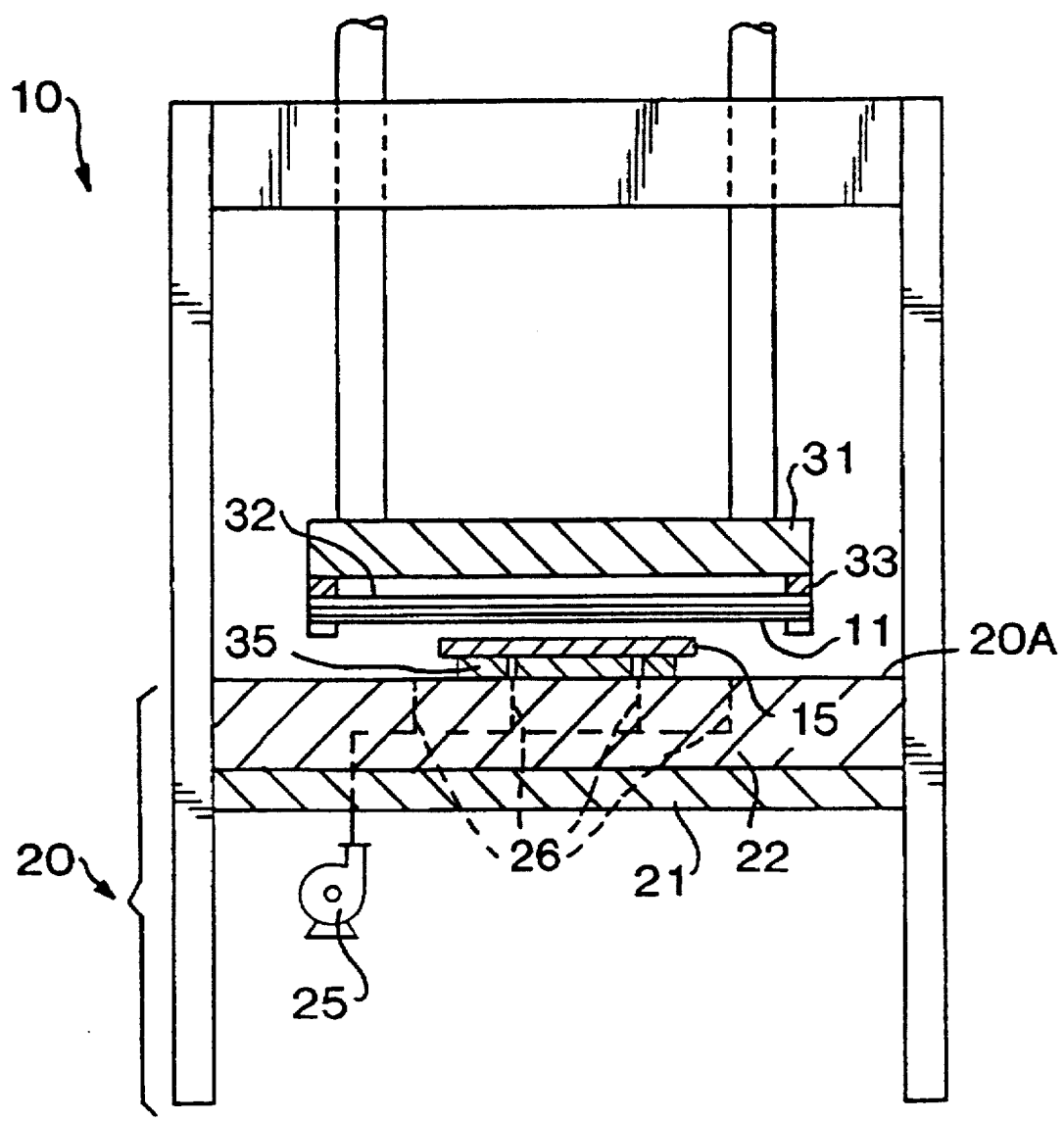
FIG. 1 is a front elevation of a membrane press according to the prior art showing various elements in cross-section, and showing the membrane press in an open position prior to pressing.

Referring now specifically to the drawings, a membrane press according to one prior art embodiment is illustrated in FIG. 1 and shown generally at reference numeral 10. The membrane press 10 is used for applying a laminating foil 11, such as polyolefine, to the exterior surface of a workpiece 15 to be laminated. Preferably, the workpiece 15 is a wood-based, profiled MFD board. Such boards are typically used as furniture fronts for cabinetry, countertops, kitchen tables, and the like.

As shown in FIG. 1, the prior art membrane press 10 includes a work base 20 for supporting the workpiece 15 to laminated. The work base 20 is constructed generally of a bottom press table 21 and bottom heating platen 22. A vacuum or suction force, generated by a turbine 25, communicates with the work base 20 through air passages 26 defined in the work base 20 to eliminate trapped air or air pockets which may form between the workpiece 15 and laminating foil 11 as the laminating foil 11 is heated and applied to the top surface, edges, and borders of the workpiece 15.

A top heating platen 31, membrane 32, and tensioning frame 33 are positioned above the workpiece 15 for heating the laminating foil 11, and applying the laminating foil 11 to the workpiece 15. According to prior art presses, in order to properly laminate the edges and peripheral borders of the workpiece 15, a dummy board 35 is placed under the workpiece 15 to slightly elevate the workpiece 15 above the supporting surface 20A of the work base 20. By elevating the workpiece 15, the press 10 can properly and uniformly apply the laminating foil 11 to the peripheral borders and contours of the workpiece 15.

Figure 2:
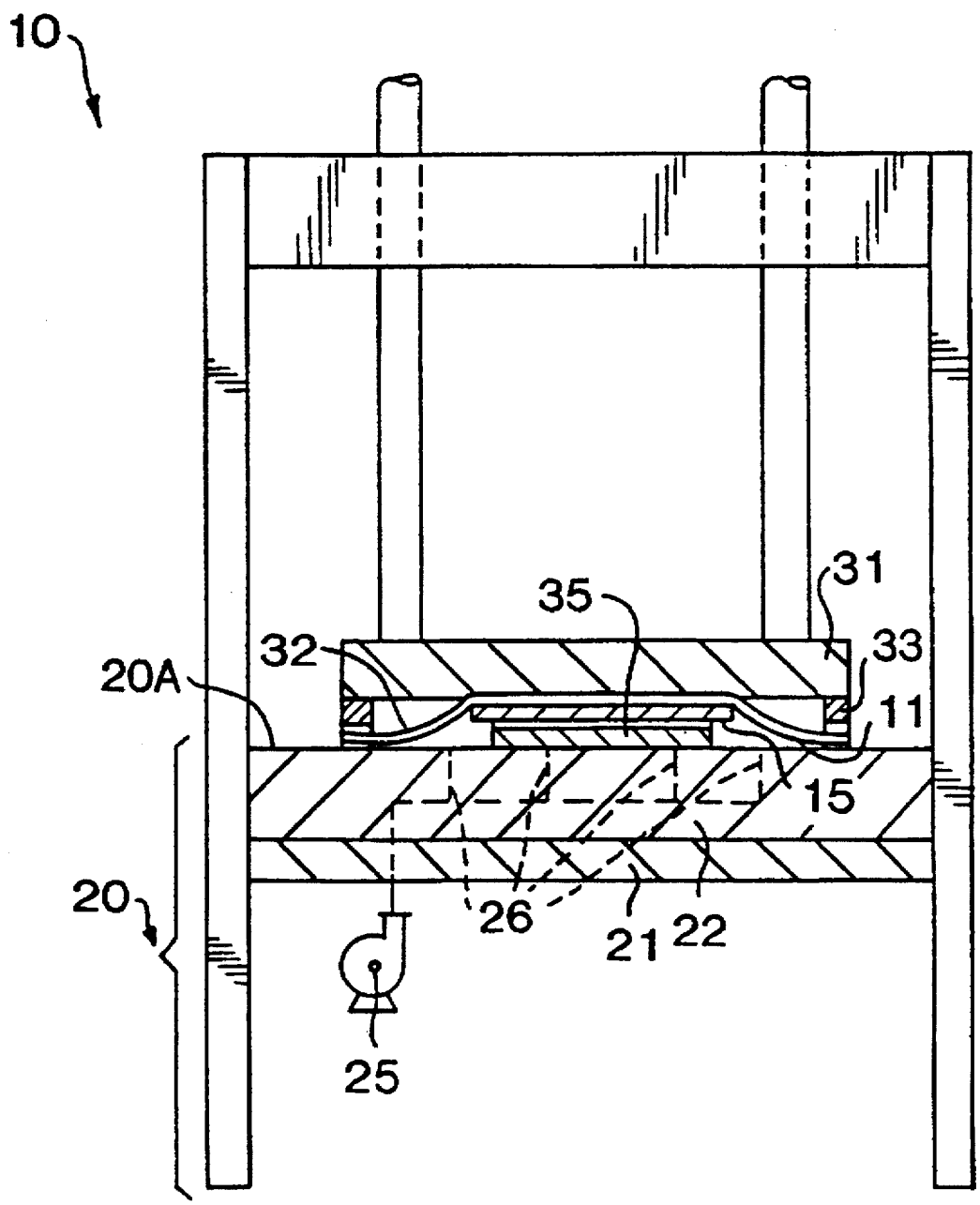
FIG. 2 is a front elevation of the membrane press illustrated in FIG. 1 showing various elements in cross-section, and showing the membrane press in a closed position during pressing.

As shown in FIG. 2, the tensioning frame 33 is lowered onto the supporting surface 20A to apply the heated, plastified foil 11 to the elevated workpiece 15. As discussed above, the suction force created by the turbine 25 serves to eliminate air pockets which may form between the workpiece 15 and laminating foil 11 as the laminating foil 11 is heated and applied to the top surface, edges, and borders of the workpiece 15.

MEMBRANE PRESS OF THE PRESENT INVENTION

Figure 3:
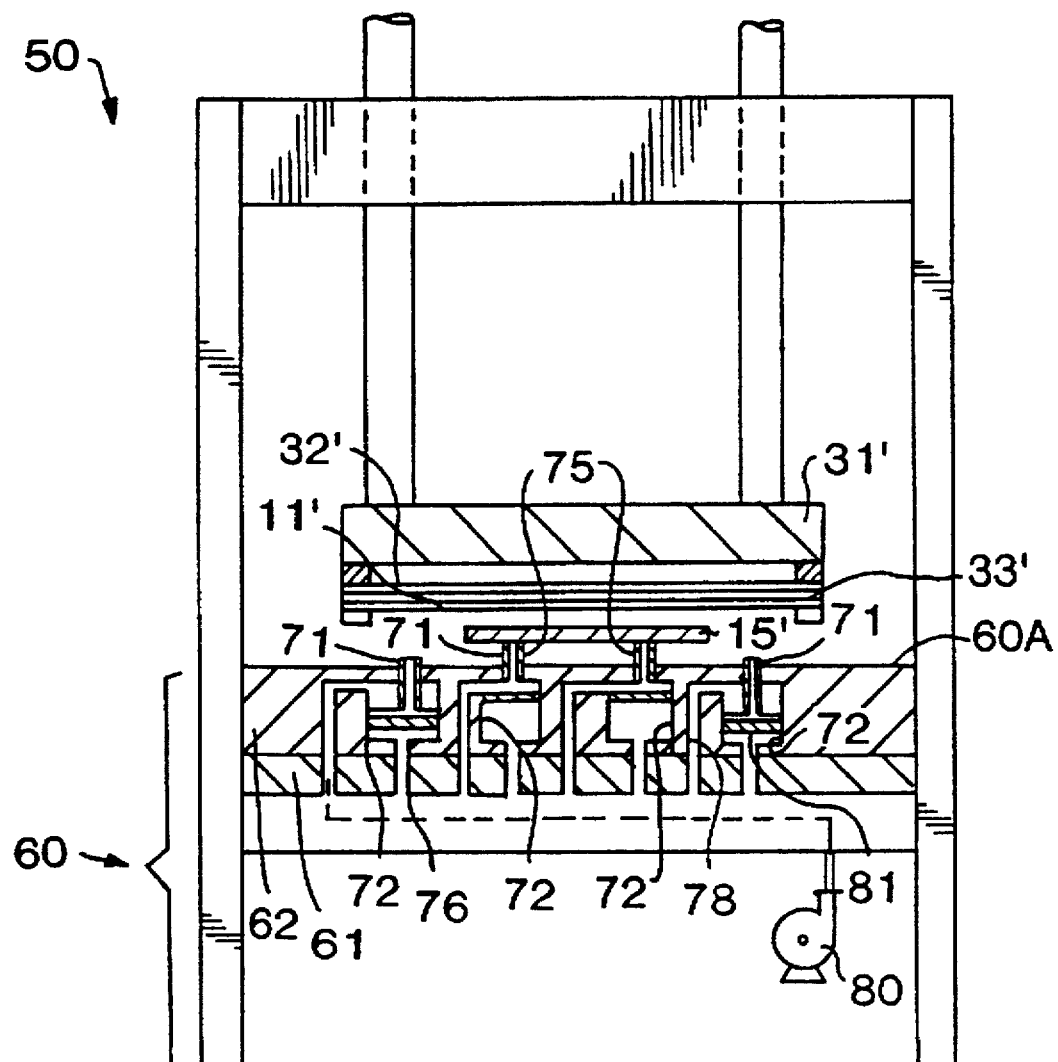
FIG. 3 is a front elevation of a membrane press according to the present invention showing various elements in cross-section, and showing the membrane press in an open position prior to pressing.

As shown in FIG. 3, the present membrane press 50 includes many of the same elements of the prior art membrane press 10 described above and illustrated in FIGS. 1 and 2. Like elements referenced in FIGS. 3–7 are indicated in prime notation. In alternative embodiments (not shown), the membrane press 50 may utilize any desired foil-pressing frame known in the art, such as a Vario-frame or multi-purpose frame. In addition, the present membrane press 50 is not limited to a particular class of presses. For example, the membrane press 50 may be one which is preferably operated without a membrane, or one which is preferably operated with a membrane, or one which must include a membrane.

The membrane press 50 preferably includes a work base 60 having a flat supporting surface 60A for carrying the workpiece 15' to be laminated. Preferably, the work base 60 includes a press table 61 supported by legs, and bottom heating platen 62. During pressing, the bottom heating platen 62 serves to further heat the laminating foil 11' as the foil 11' is applied to the workpiece 15'.

As is generally known in the art, membrane pressing occurs by clamping the edges of the laminating foil 11' into the foil-pressing frame 33', heating the foil 11' by operation of the top heating platen 31' and membrane 32', and then lowering the foil-pressing frame 33' onto the supporting surface 60A to uniformly apply the foil 11' to the workpiece 15'. When the laminating foil 11' is applied to the workpiece 15', the workpiece 15' must be sufficiently elevated above the supporting surface 60A of the work base 60 to allow proper and uniform application of the foil 11' to the corners, edges, and borders of the workpiece 15'. Preferably, the workpiece 15' is elevated approximately 15–20 mm above the supporting surface 60A during pressing.

One prior art means of elevating the workpiece 15' includes using a dummy board 35, as described above and shown in FIGS. 1 and 2. The present membrane press 50 eliminates the use of a dummy board, and instead, utilizes pneumatic elevating means responsive to the placement of the workpiece 15' onto the supporting surface 60A of the work base 60. The elevating means of the membrane press 50 is described in detail below.

WORKPIECE ELEVATING MEANS

Referring now to FIGS. 3–7, the work base 60 of the membrane press 50 includes a plurality of top-surface openings 71 and cylinders 72 formed therein for receiving and housing a plurality of workpiece-lifting pedestals 75. Preferably, prior to loading the workpiece 15' onto the work base 60, approximately 50–100 percent of the length of each pedestal 75 remains positioned within the cylinders 72 beneath the supporting surface 60A of the base 60.

Figure 4:
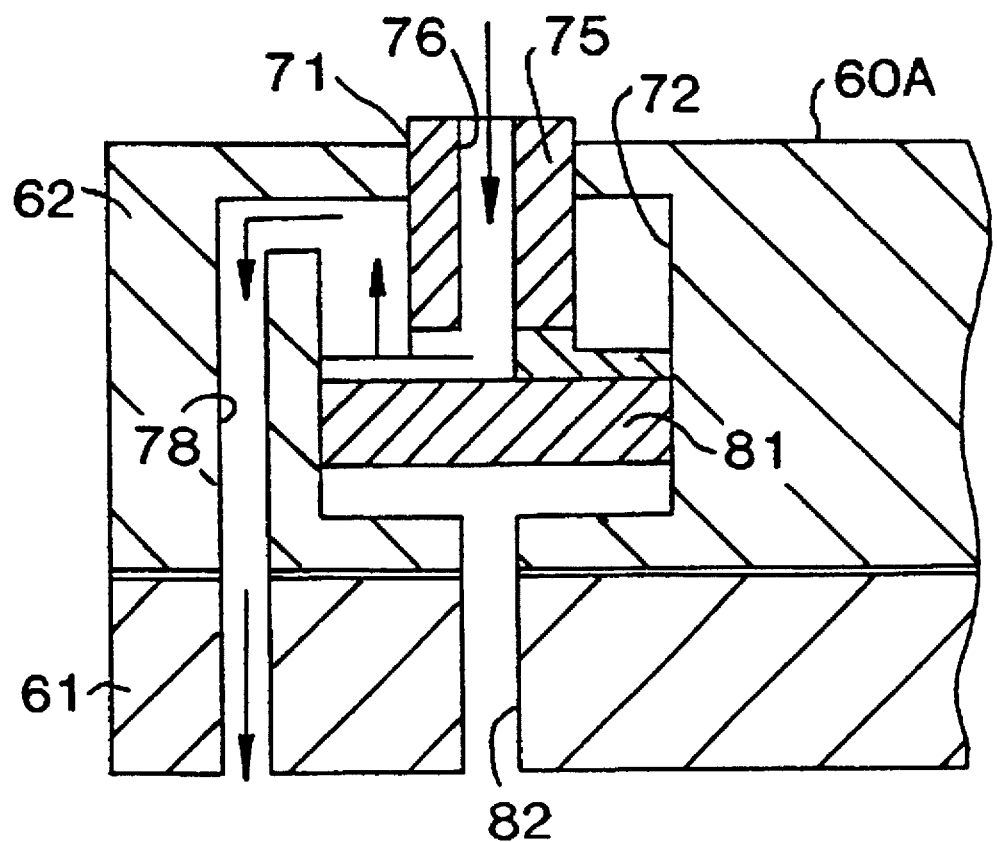
FIG. 4 is a fragmentary, enlarged, cross-sectional view of a single pedestal, piston, and cylinder according to the workpiece elevating means and membrane press of the present invention, and showing the pedestal in a workpiece-loading position within the cylinder.
Figure 5:
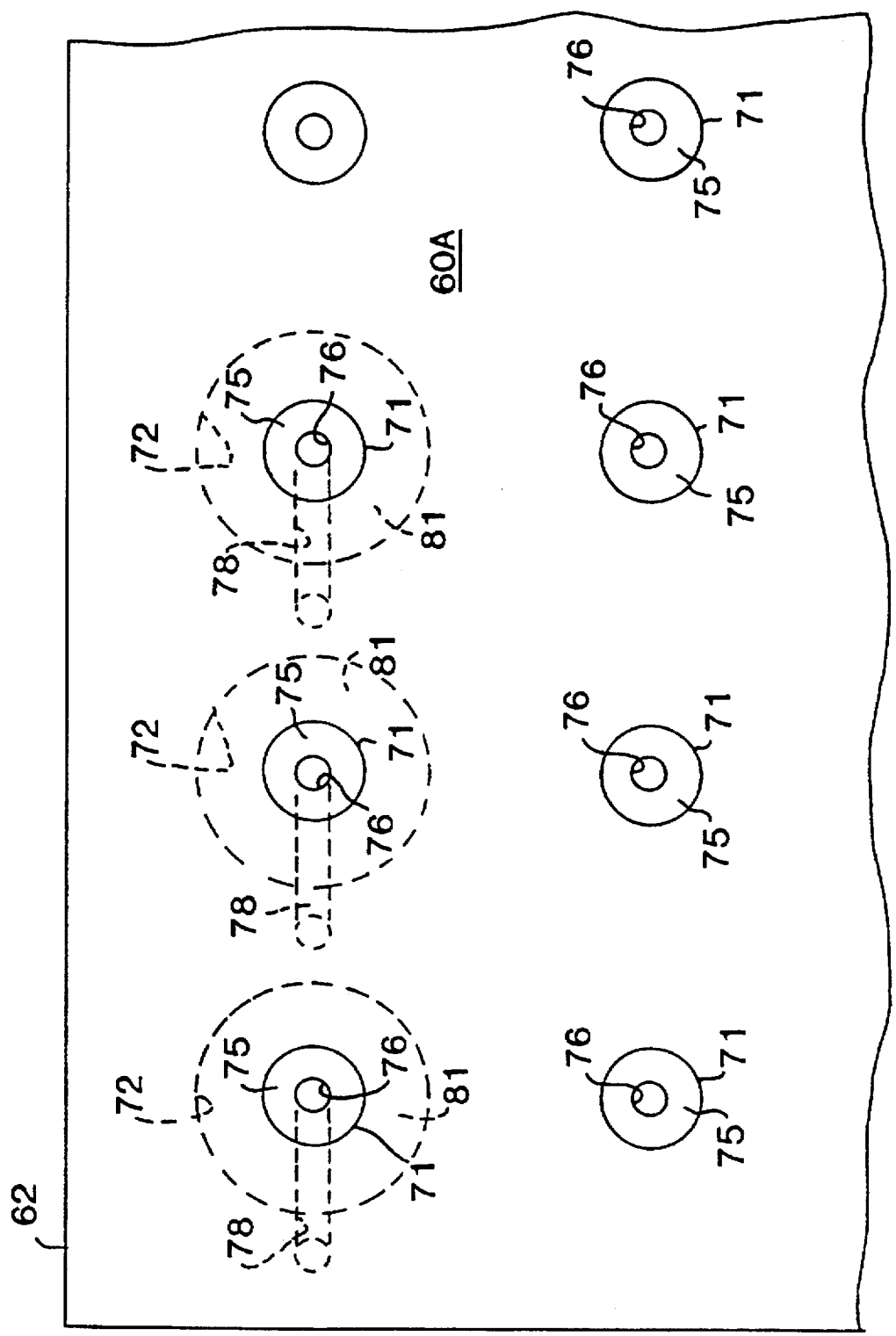
FIG. 5 is a fragmentary, top plan view of the work base according to the workpiece elevating means and membrane press of the present invention.
Figure 6:
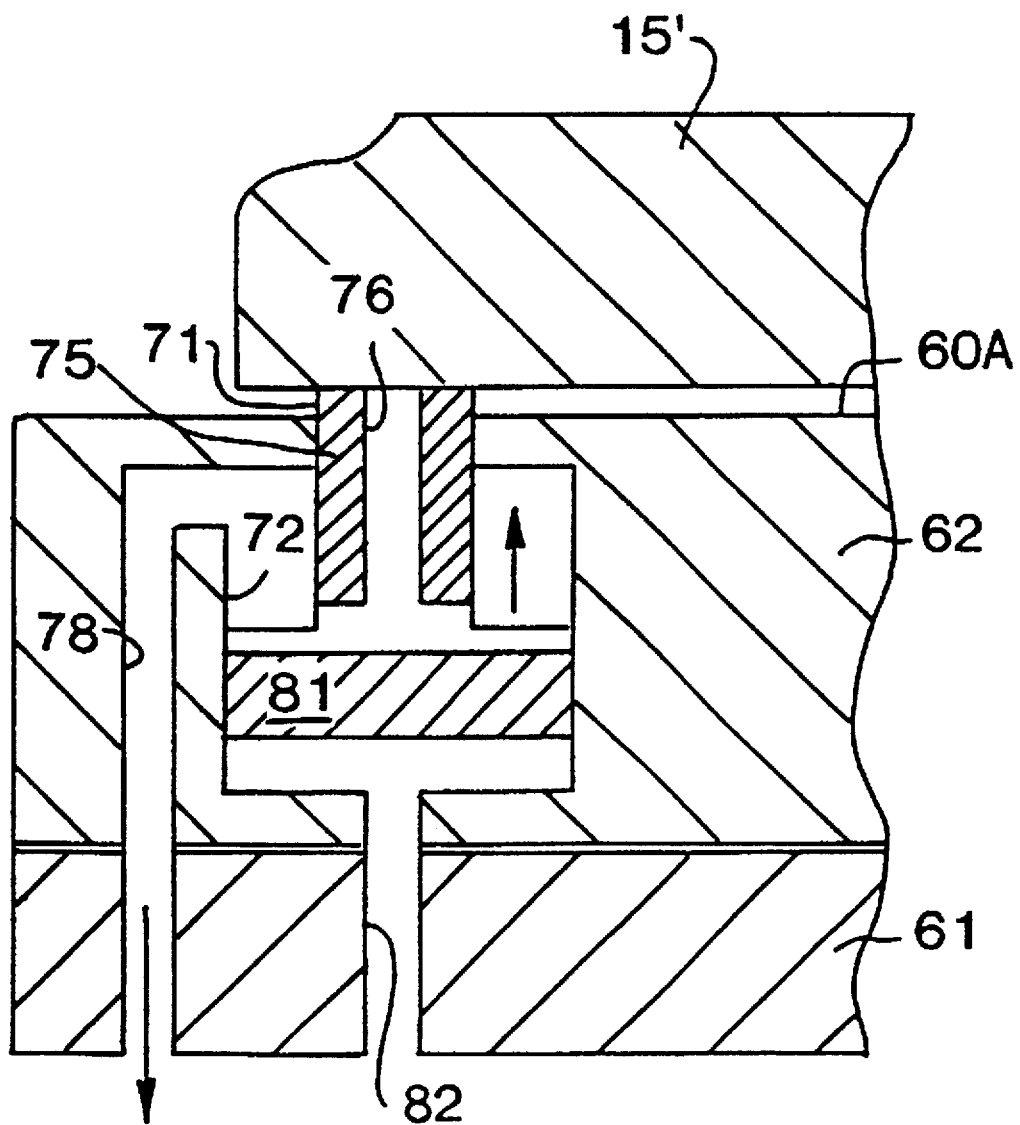
FIG. 6 is a fragmentary, enlarged, cross-sectional view of a single pedestal, piston, and cylinder showing the relative positions of the pedestal, piston, and workpiece immediately after placement of the workpiece onto the work base, and just prior to upward movement of the piston within the cylinder.
Figure 7:
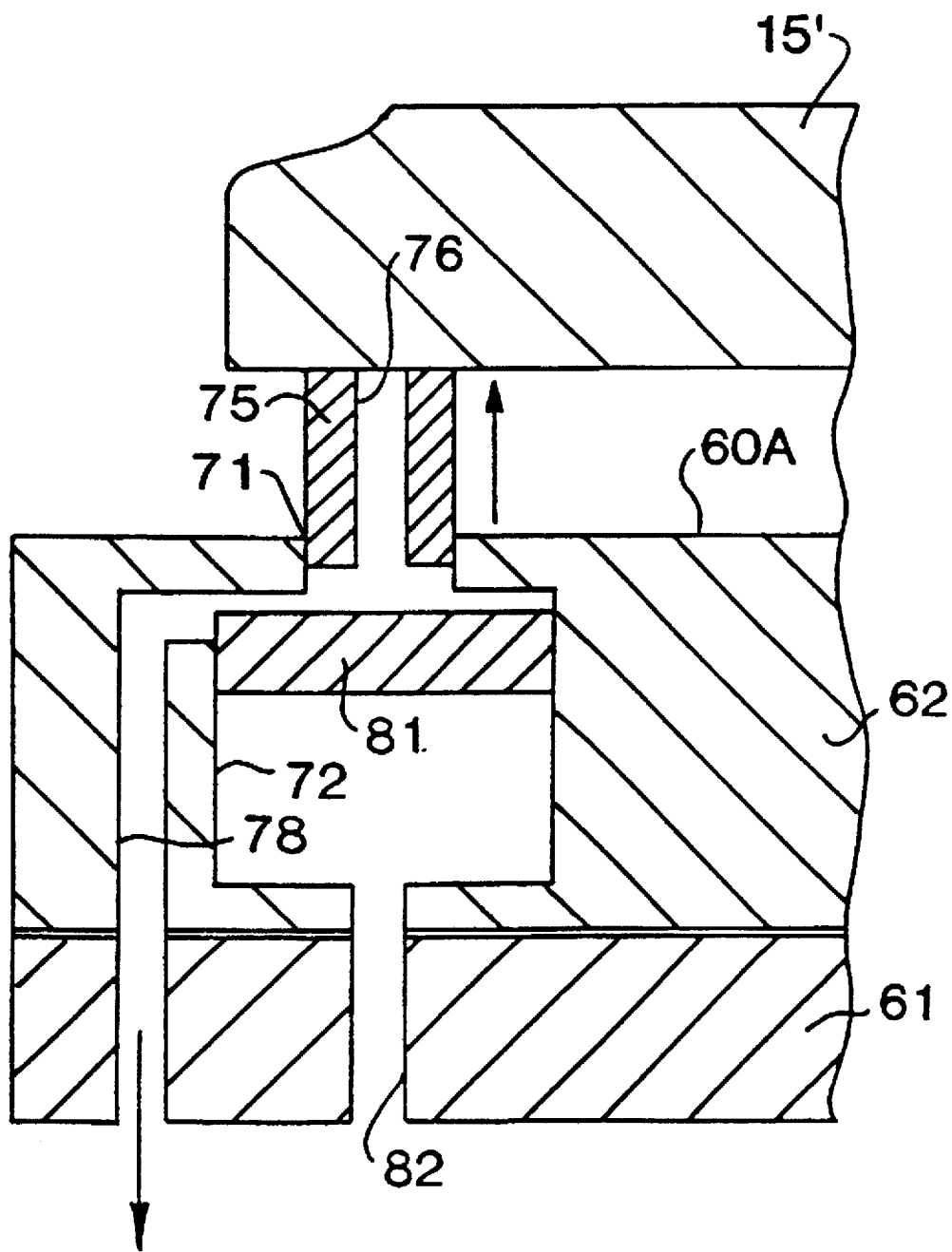
FIG. 7 is a fragmentary, enlarged, cross-sectional view of a single pedestal, piston, and cylinder showing the relative positions of the pedestal, piston, and workpiece after placement of the workpiece onto the work base, and showing the pedestal in a workpiece-laminating position above the supporting surface of the work base.

As best shown in FIGS. 4, 6, and 7, each pedestal 75 includes a longitudinal bore 76 therethrough for pneumatically communicating with an air intake passage 78 formed in the press table 61 and bottom heating platen 62 of the work base 60. As indicated by direction arrows in FIG. 4, a turbine 80 creates a negative air flow through the pedestal 75, cylinder 72, and intake passage 78 to suck in air from above the workpiece supporting surface 60A.

A piston 81 is connected to a bottom end of each pedestal 75, and cooperates with the negative air flow for imparting pneumatically-induced upward movement of the piston 81 within the cylinder 72. As discussed in detail below, the upward movement of the piston 81 and pedestal 75 is dictated by the free, unobstructed flow of air from above the supporting surface 60A through the pedestal 75, cylinder 72, and intake passage 78.

Referring now to FIGS. 6 and 7, upward movement of the pedestals 75 and the resulting elevation of the workpiece 15' in response to placement of the workpiece 15' onto the supporting surface 60A of the work base 60 is shown. FIG. 6 illustrates the position of the piston 81, pedestal 75, and workpiece 15' immediately after placement of the workpiece 15' onto the supporting surface 60A of the work base 60, and just prior to upward movement of the piston 81 within the cylinder 72. The workpiece 15' obstructs and seals air flow from above the supporting surface 60A through the pedestal 75. As a result, the negative air flow generated by the turbine 80 creates a vacuum in the cylinder 72 which produces a suction force on the rod side of the piston 81 to lift the piston 81 upwardly within the cylinder 72. Preferably, the turbine 80 generates an upward force on the piston 81 of approximately −0.7 to −0.9 bar.

As shown in FIG. 7, once the workpiece 15' has been loaded onto the supporting surface 60A, air flow through the pedestal 75 is blocked, and the resulting suction force acting on the piston 81 operates to lift the piston 81 and pedestal 75 upwardly. The upward movement of the pedestal 75 elevates the workpiece 15' above the supporting surface 60A a sufficient height and with sufficient force to permit the top surface, edges, and peripheral borders of the workpiece 15' to be properly laminated in the membrane press 50. The pedestals 75 not covered by the workpiece 15' remain positioned within the cylinders 72 and do not effect pressing of the workpiece 15'.

When the workpiece 15' is removed from the work base 60 after pressing, air flow through each pedestal 75 is unobstructed, and the respective pistons 81 and pedestals 75 return to their original positions within the cylinders 72, as shown in FIG. 4. Air is preferably exhausted from the cylinder 72 through an exhaust passage 82 formed in the heating platen 62 and press table 61.

Application of the workpiece elevating means described above in connection with the membrane press 50 is not limited to membrane presses. Rather, the elevating means may be applied to any structure having a supporting surface for carrying a workpiece to be elevated. For example, the workpiece elevating means and method may be incorporated for use in CNC routers, thermal-forming presses, deep-draw machines (vacuum presses), or any machine combining surface and edge processing in a single step.

An improved membrane press and method of elevating a workpiece above a supporting surface is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. In a membrane press for applying a laminating foil to a three-dimensional workpiece to be laminated, the membrane press including a work base having a substantially flat supporting surface for carrying said workpiece, and a foil-pressing frame positioned above said workpiece for heating and applying the laminating foil to said workpiece, the improvement in said membrane press comprising:

(a) a plurality of workpiece-lifting pedestals positioned for movement between a workpiece-loading position recessed within said work base, and a workpiece-laminating position extending above the supporting surface of said work base; and (b) elevating means automatically responsive to the placement of said workpiece onto the supporting surface of said work base to cover at least one of said pedestals, and for lifting those of said pedestals covered by said workpiece upwardly from the workpiece-loading position to the workpiece-laminating position, thereby elevating the workpiece supported on those of said pedestals for permitting the top surface, corners, and peripheral borders of the elevated workpiece to be laminated.

* * * * *